Nov. 11, 1941.   W. E. PERKINS   2,262,116
CONVEYER BELT
Filed Feb. 16, 1940

Inventor:
Wilder E. Perkins,
By: Lee J. Gary
Attorney

Patented Nov. 11, 1941

2,262,116

UNITED STATES PATENT OFFICE 2,262,116

CONVEYER BELT

Wilder E. Perkins, Passaic, N. J., assignor to Raybestos-Manhattan, Inc., Passaic, N. J., a corporation of New Jersey Application February 16, 1940, Serial No. 319,207

3 Claims. (Cl. 154—4)

This invention relates to improvements in a process for making conveyer belts, and refers specifically to a process of making a conveyer belt constructed of fabric plies, the belt being so constructed that the plies, anchored to each other by the binder between them, holds the belt in a normally troughed, concave upwardly position.

To properly train or track a conveyer belt, the belt should touch the flat or center idler, and while all belts do this when loaded, many conveyer belts will not do so when running empty. As is well known, many conveyer installations run empty part of the time, due, for instance, to intermittent processes. Not only is a stiff or normally non-troughing belt difficult to track, but due to riding on the underside adjacent the longitudinal edges on account of this failure to trough, the belt cover soon wears out for a distance of several inches adjacent the said edges permitting absorption of moisture and early disintegration.

Briefly described, my invention contemplates the construction of a conveyer belt having a plurality of superimposed plies, the upper plies of which, measured along the curve of the transverse arc, are progressively narrower than the lower plies, the plies constituting the belt being bound together by a suitable binder while said plies are held in arcuate form, whereby the belt normally assumes a troughed position and resists flattening by the tension produced in the upper plies.

Other objects and advantages of my invention will be apparent from the accompanying drawing and following detailed description.

Figure 1:
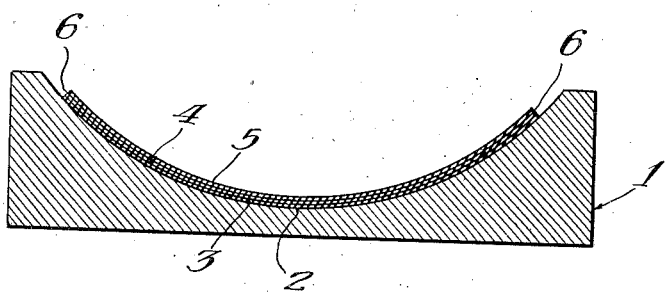
Fig. 1 is a transverse sectional view of a suitable form for making my belt.

Referring in detail to the drawing, I indicates a form which may be utilized in carrying out my invention. The form I comprises a relatively elongated member provided with a transversely arcuate trough 2.

Figure 2:
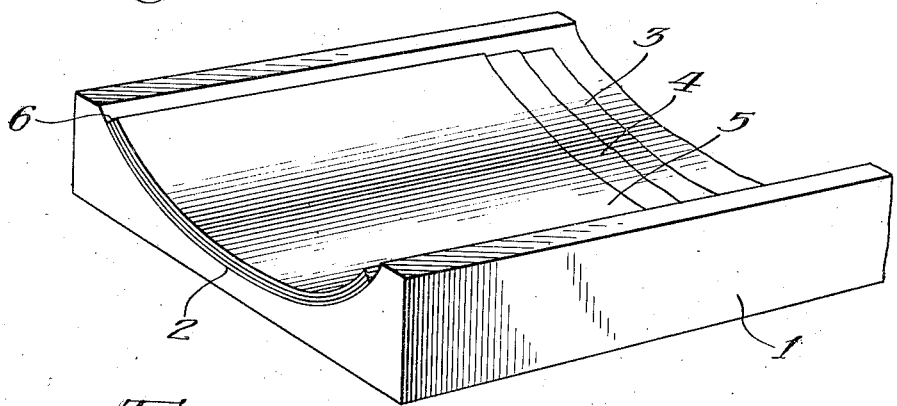
Fig. 2 is a fragmentary perspective view of the form shown in Fig. 1 with a plurality of fabric plies disposed therein.

In carrying out my invention a plurality of relatively elongated plies of fabric, preferably duck, are laid in the trough, as indicated at 3, 4 and 5 in Figs. 1 and 2. The plies 3, 4 and 5 are impregnated with rubber or other suitable binder which is normally in a relatively tacky condition and, of course, it is to be understood that any number of such plies may be employed depending upon the strength required of the finished belt.

In placing the ply 3 in the trough it is caused to conform to the contour of said trough. The upper plies 4 and 5 are then superimposed upon the lowest ply 3 and all are caused to conform in contour in nested fashion. If the belt carcass is vulcanized or cured while being maintained in transversely arced condition, the finished belt will normally take the arced set and will thereafter tend to resist flattening. Of course, my invention contemplates curing the belt while the same is either flat or arced. If the pressing and vulcanizing or curing takes place with the belt in flattened condition, the upper plies will be vulcanized or cured while in tension, and upon being released from the mold, will cause the belt to trough transversely.

To finish the belt a rubber or duck cover 7 may envelop the belt. If a duck cover is used, it may be laid in the bottom of the trough 2 prior to superimposing the plies 3, 4 and 5. The width of the cover will, of course, be greater than the width of the widest ply 3 whereby the outwardly extending edges of the cover ply may be wrapped over all or a portion of the upper face of the belt. If a rubber cover is applied to the belt, application will usually be made prior to vulcanizing. If a duck cover is used it is to be understood that the cover may comprise one or more layers of duck fabric.

Figure 3:
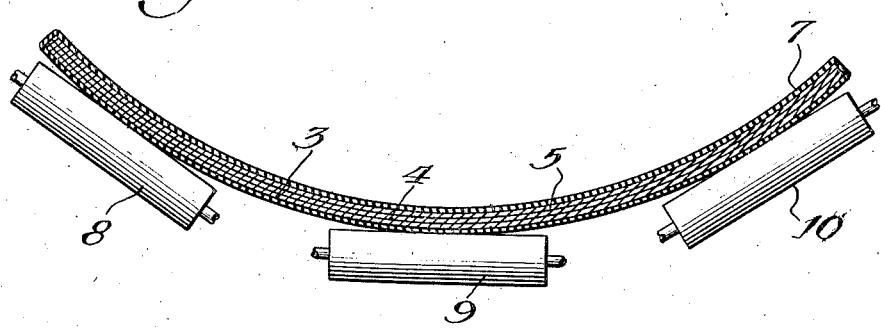
Fig. 3 is a transverse sectional view of my finished belt riding empty upon supporting rollers.

The finished belt, having a transversely arced set, will when unloaded, ride upon the troughing rollers 8, 9 and 10 in the manner shown in Fig. 3 with the center of the belt riding on the center roller 9 and a relatively larger area of the belt bearing on both outer rollers 8 and 10.

I claim as my invention:

1. A method of making a laminated conveyer belt of greater width and length than thickness which is normally transversely arced concave upwardly which comprises, superimposing a plurality of relatively elongated plies of fabric impregnated with a relatively tacky curable binder, while supporting said plies in transversely arcuate position, flattening said plies and pressing said plies together in flattened condition while the same are held immovable relative to each other, and subjecting said plies to heat while the same are held in flattened condition immovable relative to each other to cure the binder.

2. A method of making a laminated conveyer belt of greater width and length than thickness which is normally transversely arced concave upwardly which comprises, superimposing a plurality of relatively elongated plies of fabric impregnated with a relatively tacky curable binder, temporarily securing said plies together into transversely arcuate form, flattening said plies, and simultaneously subjecting said plies to heat and pressure while the same are held in flattened condition immovable relative to each other and in intimate contact with each other to cure the binder and anchor adjacent plies together throughout substantially their entire mutually contacting areas.

3. A method of making a laminated conveyer belt which is normally transversely arced which comprises, superimposing a plurality of relatively elongated fabric plies impregnated with a curable binder upon a relatively elongated transversely arced surface, flattening said superimposed plies, maintaining said plies immovable with respect to each other during the flattening operation, thereby transversely tensioning the upper plies, and pressing the plies and curing the binder while the plies are so held together and while the plies are in transverse tension.

WILDER E. PERKINS.